United States Patent
Cheng et al.

(10) Patent No.: US 7,107,609 B2
(45) Date of Patent: Sep. 12, 2006

(54) STATEFUL PACKET FORWARDING IN A FIREWALL CLUSTER

(75) Inventors: Lebin Cheng, Fremont, CA (US); Samuel D. Horowitz, Belmont, CA (US); Brian L. Jemes, Moscow, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 09/908,602

(22) Filed: Jul. 20, 2001

(65) Prior Publication Data
US 2003/0018914 A1    Jan. 23, 2003

(51) Int. Cl.
G06F 7/04 (2006.01)
G06F 9/00 (2006.01)

(52) U.S. Cl. .............................. 726/3; 726/11; 726/12; 726/13

(58) Field of Classification Search ................ 713/201, 713/153, 150, 160, 154, 163; 709/249; 370/389; 726/3, 11, 12, 13
See application file for complete search history.

(56) References Cited

U.S. PATENT DOCUMENTS

| | | | | |
|---|---|---|---|---|
| 6,078,957 A | * | 6/2000 | Adelman et al. | ........... 709/224 |
| 6,779,039 B1 | * | 8/2004 | Bommareddy et al. | ..... 709/226 |
| 6,880,089 B1 | * | 4/2005 | Bommareddy et al. | ........ 726/11 |
| 2003/0002494 A1 | * | 1/2003 | Kuukankorpi et al. | ...... 370/386 |

OTHER PUBLICATIONS

Aversa, Luis and Bestavros, Azer, "Load Balancing a Cluster of Web Servers", 1999, pp. 1-13.*
Alteon Web Systems, Inc., "Enhancing Web User Experience With Global Server Load Balancing", www.alteon.com, Jun. 1999, pp. 1-7.
Alteon Web Systems, Inc., "Firewall Load Balancing: Web Switching to Optimize Firewall Performance", www.alteon.com, Jun. 1999, pp. 1-6.
Cisco Systems, Inc., "Release Notes for the Cisco Secure Pix Firewall Version 6.0(1)", www.cisco.com, Jun. 2001, pp. 1-56.

* cited by examiner

*Primary Examiner*—Emmanuel L. Moise
*Assistant Examiner*—Courtney Fields (57) ABSTRACT

A method is disclosed for processing data using multiple interconnected firewall devices. A connection is initiated between an internal host and an external network, through a home firewall device. A separate, receiving firewall device may then receive a data packet for the internal host as part of a flow. The receiving device attempts to determine the home device for the packet. The receiving device sends a multicast to all other firewall devices in the firewall cluster. The multicast includes the data packet and information about the receiving device. The home device receives the multicast and responds, indicating that it is the home device. The home device extracts the data packet from the multicast and forwards it to the internal host. The receiving device stores the response information along with other forwarding information that is used to automatically forward to the home device subsequent data packets for the flow.

28 Claims, 6 Drawing Sheets

STATEFUL PACKET FORWARDING IN A FIREWALL CLUSTER

FIELD OF INVENTION

The present invention relates generally to computer networking. More particularly, it relates to a method and system for processing information via a global computer network using multiple firewall devices in a firewall cluster.

BACKGROUND

Many enterprises employ the "firewall" mechanism to protect their computer networks. A typical firewall device is located at the boundary of the enterprise network. It inspects network traffic flows entering or leaving the internal network, and filters out "unwanted" packets of data. Conventional firewall devices support stateful inspection to enforce more complicated security policies involving stateful network protocols. For example, one popular firewall policy allows Transmission Control Protocol (TCP) connections initiated from internal hosts, but denies TCP connections initiated from outside the network. A stateful inspection firewall handles this by creating a new connection state whenever it captures the first data packet of a data flow for a TCP connection initiated from an internal host. This packet is sometimes referred to as the TCP "SYN" packet. State information may be stored locally to the firewall device for the lifetime of the network flow.

State information about a network flow or connection is established in a firewall device when the first data packet initiating the connection is processed. In the TCP case, it may be referred to as the SYN packet. In the case of a User Datagram Protocol (UDP) session, it is the first UDP packet sent by the client. The data packets in a flow include header information about the packet. Subsequent packets are considered part of the flow if the packet's header information includes information for the connection. Different firewall implementations may have different header information, but they generally include information such as source and destination Internet protocol (IP) addresses and ports.

Due to the extra functions it performs, a firewall can sometimes become a performance bottleneck. One conventional solution uses a cluster of multiple load-balancing firewall devices. In order to support stateful inspection, these firewall devices must either share global state information or have some kind of traffic redirection device. A redirection device forwards packets of an established connection to the "home" firewall device in which the state information is kept locally.

Global state information-sharing is complicated and does not scale well when the number of firewall devices in a cluster rises. Because many network connections are "short-lived," processing power of firewall devices is wasted on global state synchronization. Using redirection devices increases the complexity and cost of the architecture, especially when multiple redirection devices are required to eliminate single point of failure. System administrators must manage a cluster of redirection devices in addition to the firewall cluster. What is needed is a method and system for better processing firewall transactions in systems having multiple firewall devices.

SUMMARY OF INVENTION

A method is disclosed for processing data using multiple interconnected firewall devices. A connection is initiated between an internal host, which may be a computer terminal in a network, and an external host in a global computer network, such as the Internet, through a firewall device. Packets of data in a data flow pass between the internal and external hosts, through the firewall. When the external host sends response packets to the internal host, these packets may arrive at a firewall device other than the device that processed the packet initialization. The receiving firewall device attempts to determine the home device for the packet. In order to determine the state of the connection, the receiving device first determines whether it is the home device—that is, the device that processed the connection-initialization packet. If it is the home device, then it forwards the packet to the internal host. If it is not the home device, then the receiving device uses forwarding information to determine the home device and forwards the packet to the home device reflected in the forwarding information. If the forwarding information does not include an entry for the home device, then the receiving firewall device sends a multicast to all other firewall devices in the firewall cluster to identify the home device. The multicast includes the data packet as well as information about the receiving device. The home firewall device receives the multicast and responds to the receiving device, indicating that it is the home device. The home device also extracts the data packet from the multicast and forwards it to the internal host. In one embodiment, the receiving device stores the reply information sent by the home device in a forward table with other forwarding information, and the information is used to automatically forward to the home device additional data packets for the flow.

A firewall device is also disclosed for storing forwarding information and state information, for example in a forward table and a state table. The state information tracks the data flows for which the device is the home device, and the forwarding information tracks home devices for other flows. When the device receives a packet, it determines whether it is the home device, and forwards the packet to the appropriate internal host if it is the home device. If it is not the home device, it uses its forwarding information to determine the home device for the packet. If the forwarding information does not include information for the flow, then the device sends a multicast including the data packet to all other firewall devices in the firewall cluster to identify the home device. The device receives a response to its multicast request and stores it with its other forwarding information for use with subsequent packets in the flow.

DETAILED DESCRIPTION

Figure 1:
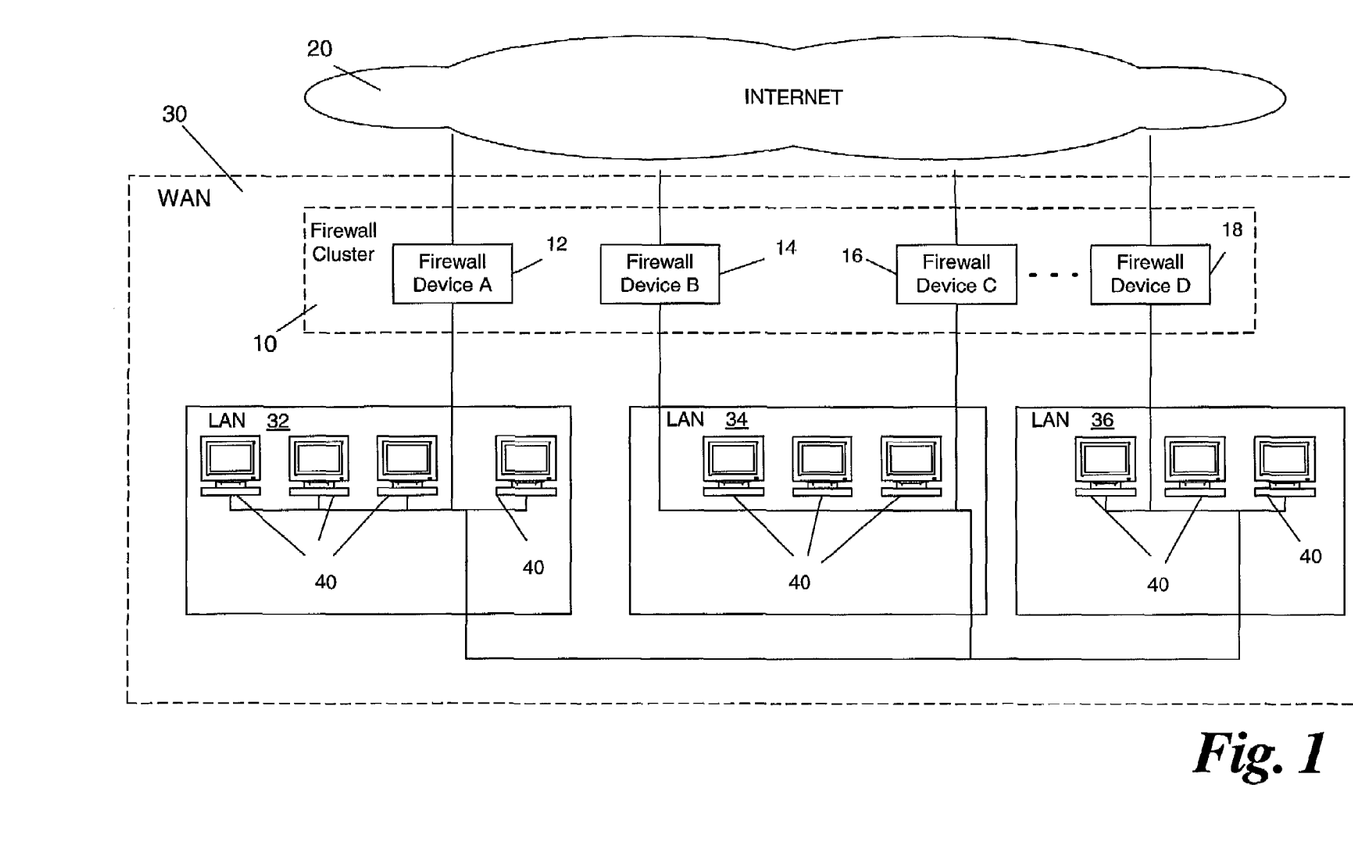
FIG. 1 shows a block diagram of an enterprise network that uses the method.

FIG. 1 shows a system on which the firewall method may be applied. An enterprise includes an internal network 30, such as a wide area network (WAN), 30 having computer terminals 40, such as personal computers 40, or other internal hosts 40 that access the Internet 20 or other global computer network 20, through a firewall at the boundary of the internal network 30. The internal host 40 may connect to an external host by various types of communications protocols, including conventional transmission control protocol/Internet protocol (TCP/IP). As used herein, an internal host 40 refers to any device connected to the internal network 30 that connects to an external network 20 through the firewall cluster 10. In the example of FIG. 1, the firewall consists of multiple firewall devices 12, 14, 16, 18 referred to collectively as a firewall cluster 10. The firewall devices 12, 14, 16, 18 are interconnected by the network 30, and it is possible for a single internal host 40 to access the Internet 20 through more than one firewall device 12, 14, 16, 18. For example, the network 30 may have multiple sub-HP networks 32, 34, 36, such as the local area networks (LANS) 32, 34, 36 shown in FIG. 1. These sub-networks 32, 34, 36 may be geographically separated, in which case it may be desirable to have separate firewall devices 12, 14, 16, 18 for each sub-network 32, 34, 36. In the example shown, even a sub-network 34 that is geographically contained, such as the LAN 34, might have more than one firewall device 14, 16.

Figure 2:
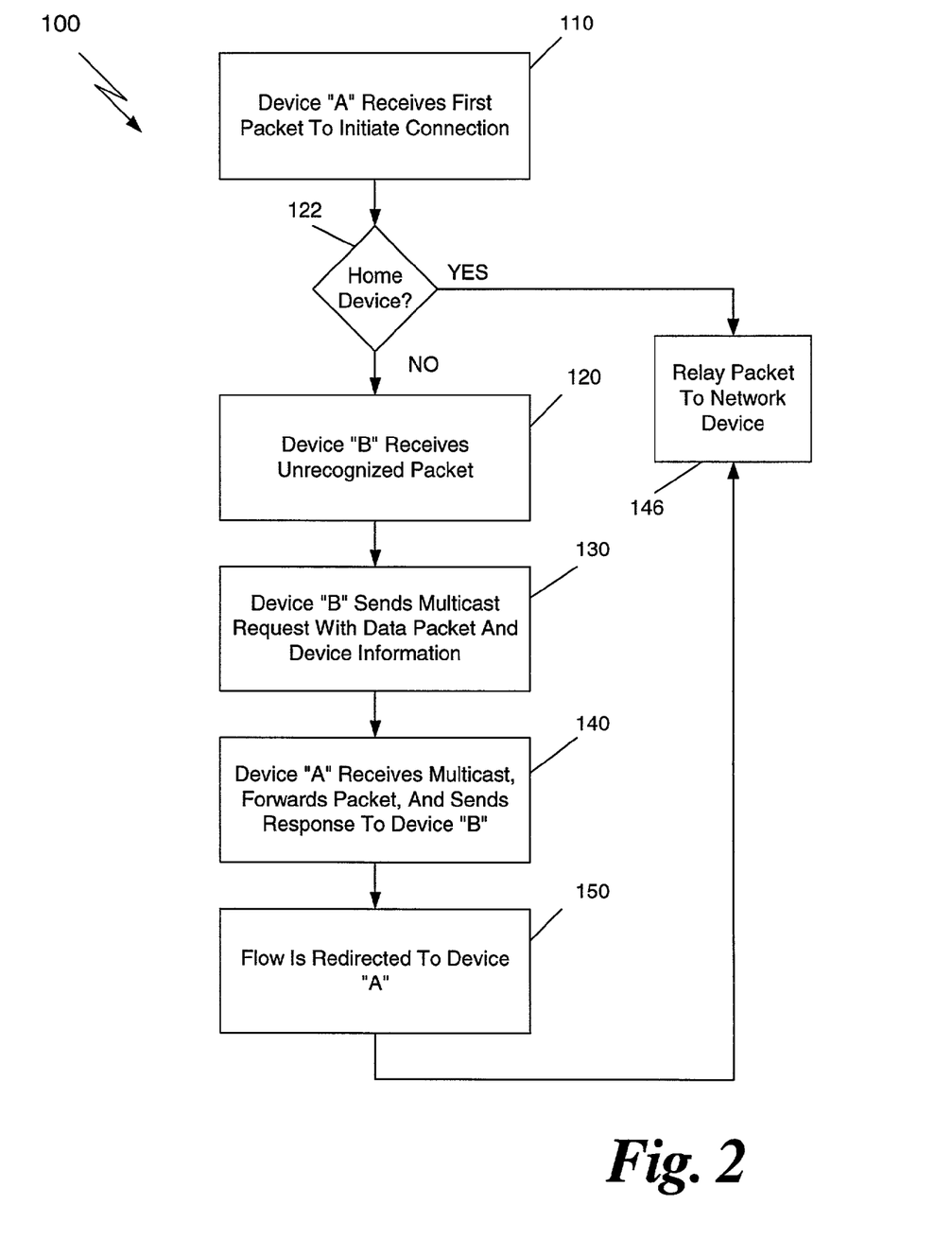
FIG. 2 shows a flow chart of the method for processing firewall transactions.

FIG. 2 shows the method 100 used to process packets of information transferred between an internal host 40 and an external network 20 through the firewall cluster 10. As used herein, a packet refers to any data element capable of being transferred through a firewall between an internal network 30 and an external network 20. In use, a particular internal host 40 may access the Internet 20 by initiating 110 a connection that sends a data flow through a particular firewall device 12, for example firewall device A 12. Data packets sent through the firewall devices 12, 14, 16, 18 are related to the data flow if they are part of the connection between the internal host 40 and the external network 20. Because multiple firewall devices 12, 14, 16, 18 are used, in one implementation return data packets may be received by any of the firewall devices 12, 14, 16, 18, such a firewall device 14, 16, 18 other than the home firewall device 12 (firewall devices B, C, or D 14, 16, 18 in FIG. 1). When one of the firewall devices 12, 14, 16, 18, such as firewall device B 14 in the example of FIG. 2, receives 120 a data packet it first determines 122 whether it is the home device for the flow. A device 12, 14, 16, 18 in a state of receiving a data packet may be referred to as the "receiving device." If the receiving device 12, 14, 16, 18 is the home device, then it processes 146 the data packet as it ordinarily would, for example, by forwarding 146 the packet to the internal host 40.

If the receiving device 12, 14, 16, 18 is not the home device, then the receiving device 12, 14, 16, 18, such as device B 14 in FIG. 2, then the packet is an "out-of-sync," or "unrecognized," packet and the receiving device 14 determines the home device 12 so that the packet may be forwarded to the home device 12. The firewall devices 12, 14, 16, 18 maintain forwarding information that is used to redirect received packets to the particular firewall device 12 that initiated the transaction. In one embodiment, the forwarding information is stored in a forward table in each of the firewall devices 12, 14, 16, 18. Although the forwarding information is described with respect to forwarding tables, one skilled in the art will recognize that any data structure may be used to store the forwarding information. In one embodiment, firewall devices 12, 14, 16, 18 do not maintain forward table information for flows for which they are the home device.

If the forward table for firewall device B 14, as the receiving device, does not include an entry for the "out-of-sync" packet, then firewall device B 14 sends 130 a multicast signal to other firewall devices 12, 16, 18 with the packet of data, requesting the identity of the home firewall device. As used herein, a multicast refers to any signal sent from a firewall device to at least one other firewall device. Firewall device A 12 receives the multicast, forwards the packet of data to the proper internal host 40, and sends 140 a response to firewall device B 14 explaining that firewall device A 12 is the home device 12 for the flow. Firewall device B 14 receives the response from firewall device A 12 and stores the home device information in its forward table. Thereafter, packets for that flow received by firewall device B 14 are automatically forwarded 150 from the receiving device 14 to the home device 12 using the forwarding information. Firewall device A 12, as the home device 12, processes 146 the packets, for example, by forwarding 146 them to the internal host 40.

Figure 3:
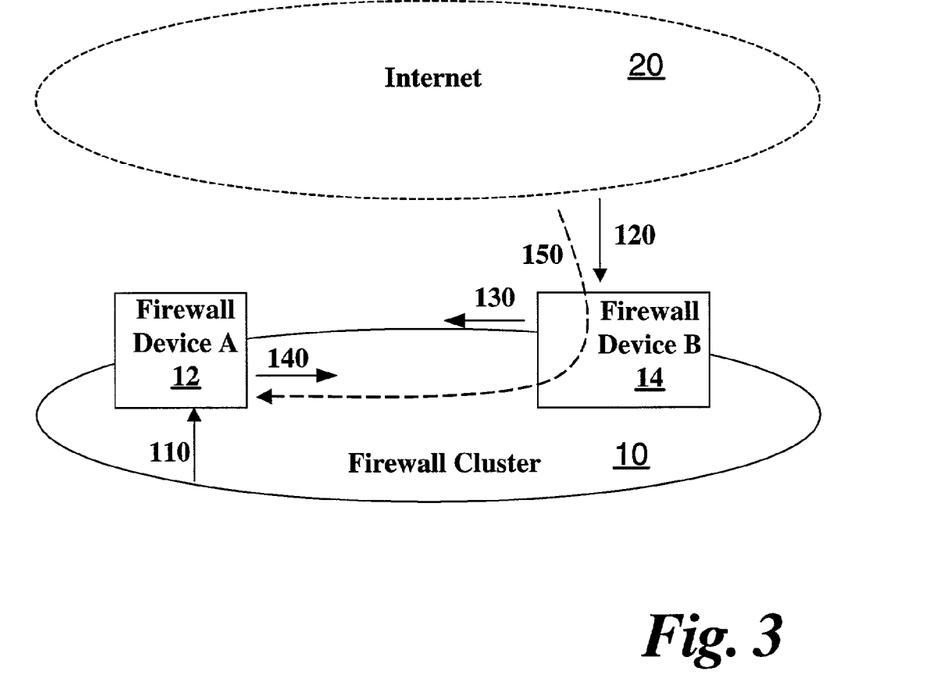
FIG. 3 shows a block diagram of firewall cluster using the method of FIG. 2.

FIG. 3 shows a block diagram of the firewall cluster 10 connected to the Internet 20. FIG. 3 illustrates the method 100 as described in the example shown in FIG. 2 in which firewall device A 12 is the home device 12 for a flow and firewall device B 14 receives a packet for that flow from the external network 20. In use, an internal host 40, such as a computer terminal 40, initiates 110 a connection to the Internet 20 though a home firewall device 12, firewall device A 12. Data is received 120 from the Internet 20 by a separate receiving firewall device 14, firewall device B 14. The first time that the receiving firewall device 14 receives 120 a packet of data, firewall device B may not know where to forward it because there is no entry in firewall device B's forward table. Firewall device B 14 sends a 130 multicast request through the firewall cluster 10 to other firewall devices, including firewall device A 12, which is the home device. The multicast includes the received "out-of-sync" packet and additional information about the receiving device, firewall device B 14. Firewall device A 12 receives 140 the multicast, forwards the data packet to the proper internal host 40, and responds to firewall device B 14 using the additional information. Based on the response, firewall device B 14 associates the flow with the firewall device A 12 and adds this information to its forward table. Thereafter, packets of data for the flow that are received by firewall device B are automatically forwarded 150 to firewall device A, using the forward table. Firewall device A 12 may then process the packets, for example, by inspecting them and forwarding them to the internal host 40.

Figure 4:
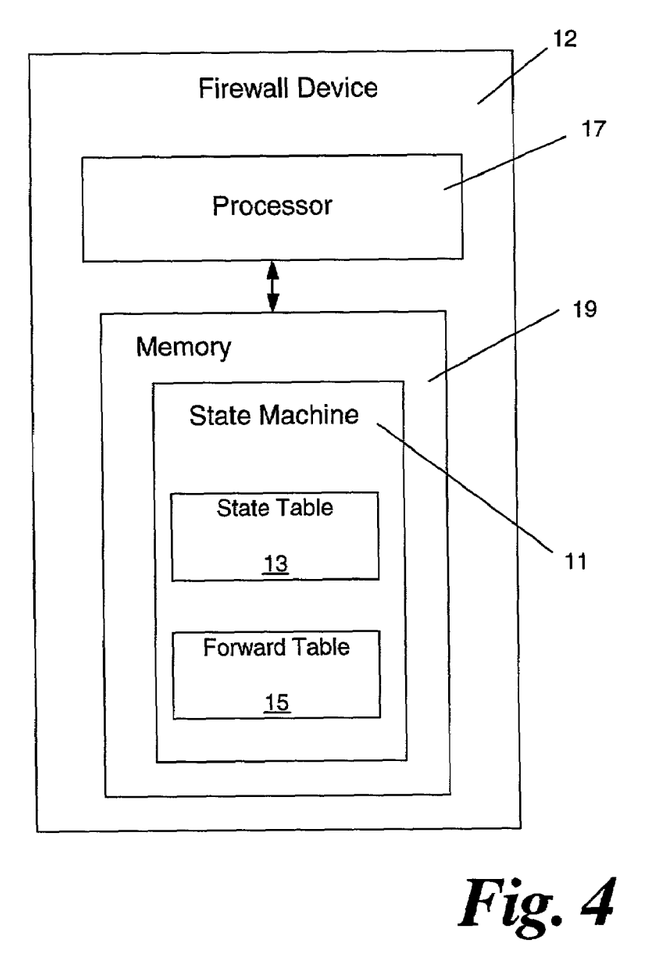
FIG. 4 shows a block diagram of a firewall device.

FIG. 4 shows a block diagram of a firewall device 12. The firewall device 12 includes a processor 17 for executing the method 100 shown in FIG. 2. In the embodiment shown, the processor 17 accesses a state machine 11 stored in memory 19 of the device 12 that is used to process packets. A state machine 11 refers to any software or data structure stored in memory 19 that stores a state of a the firewall device 12. The method 100 performs functions based on the state stored in the state machine 11. The state machine 11 includes a state table 13 that stores state information for processing firewall transactions. In one embodiment, the state information includes an entry for each flow for which the firewall device 12 is the home device. Each entry flow identification information such as a protocol identifier that indicates the type of protocol used for the transaction (e.g., TCP, UDP), a source IP address for the source of the data packet, a source port, a destination IP address, and a destination port. Each entry may also store other information, such as routing information and relay information indicating the internal host of the packet. Corresponding information for the flow may be contained in each data packet passing through the firewall device 12. In the example, the firewall device 12 receives a packet of data having the flow information and looks for an entry in the state table having that same flow information, using a hash table. If the data packet's flow information corresponds to an entry in the state table 13, then the firewall device 12 is the home device. Although the state information is shown in a state table 13, other data structures may be used to store the state information.

The state machine 11 may include a method embodied in executable software instructions for determining how to process data packets through the firewall device 12. The device 12 may be in various states at different instances. For example, the device 12 may receive 120 packets directly from the external network 20 for which it is the home device, the device 12 may receive 130 forwarded packets from another device (such as firewall device B 14 in the example of FIGS. 2 and 3), or the device 12 may receive 120 unrecognized packets, which may have two states of its own—one in which the device 12 must send 130 a multicast request and one in which the device has stored the home device information in its forward table 15 and is simply forwarding packets to the home device. The forward table 15 has forwarding information used to forward unrecognized packets from the firewall device 12 to another device that is the home device. In one example, the forward table 15 includes separate entries for separate flows. The forwarding information may include the same information as the state table 13, such as the protocol identifier, the source IP address, the source port, the destination IP address, and the destination port, to identify a flow. The forwarding information also includes for each entry the home firewall IP address. This information enables the firewall device 12 to associate a flow of data with a home device. As with the state information, the forward information may be embodied other data structures, although a forward table 15 is given as an example.

Figure 5:
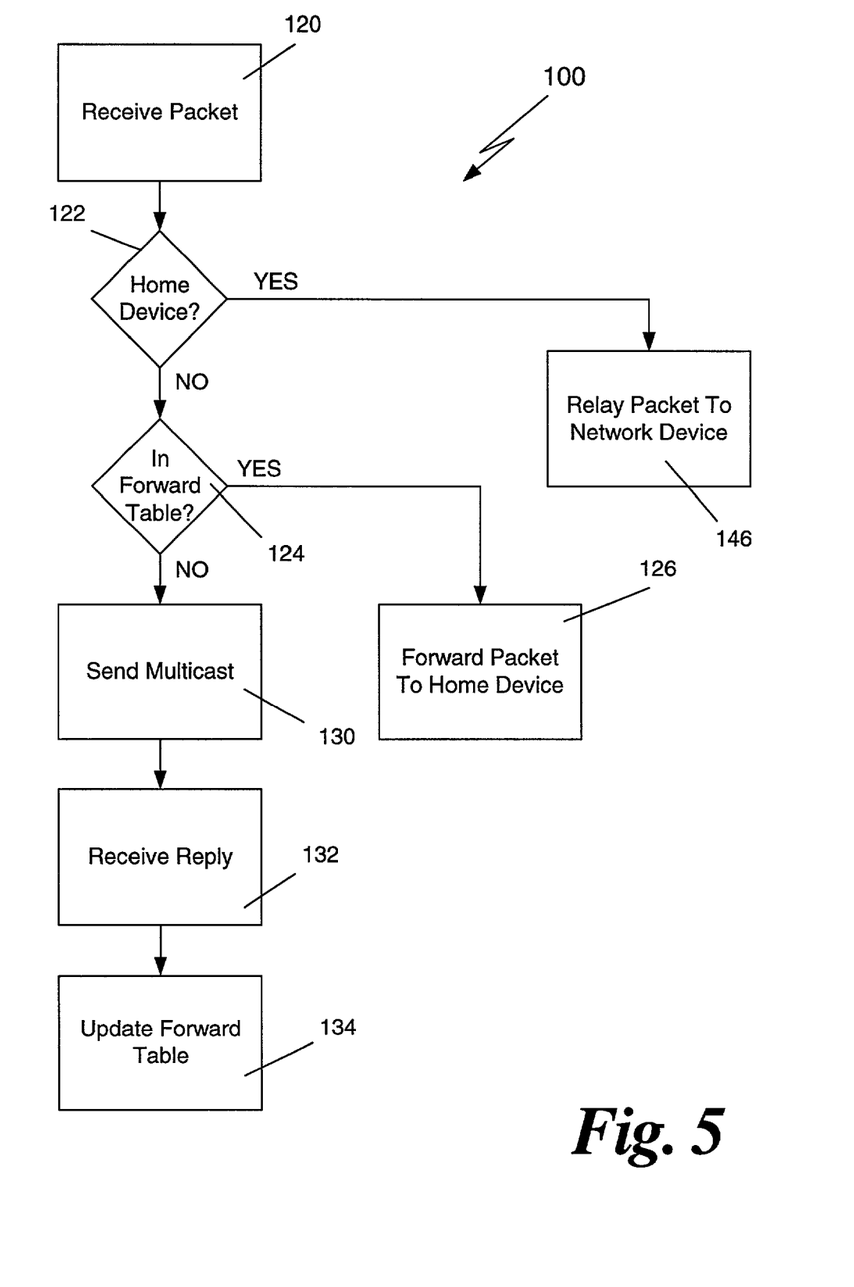
FIG. 5 shows a more detailed flow chart of portions of the method of FIG. 2.
Figure 6:
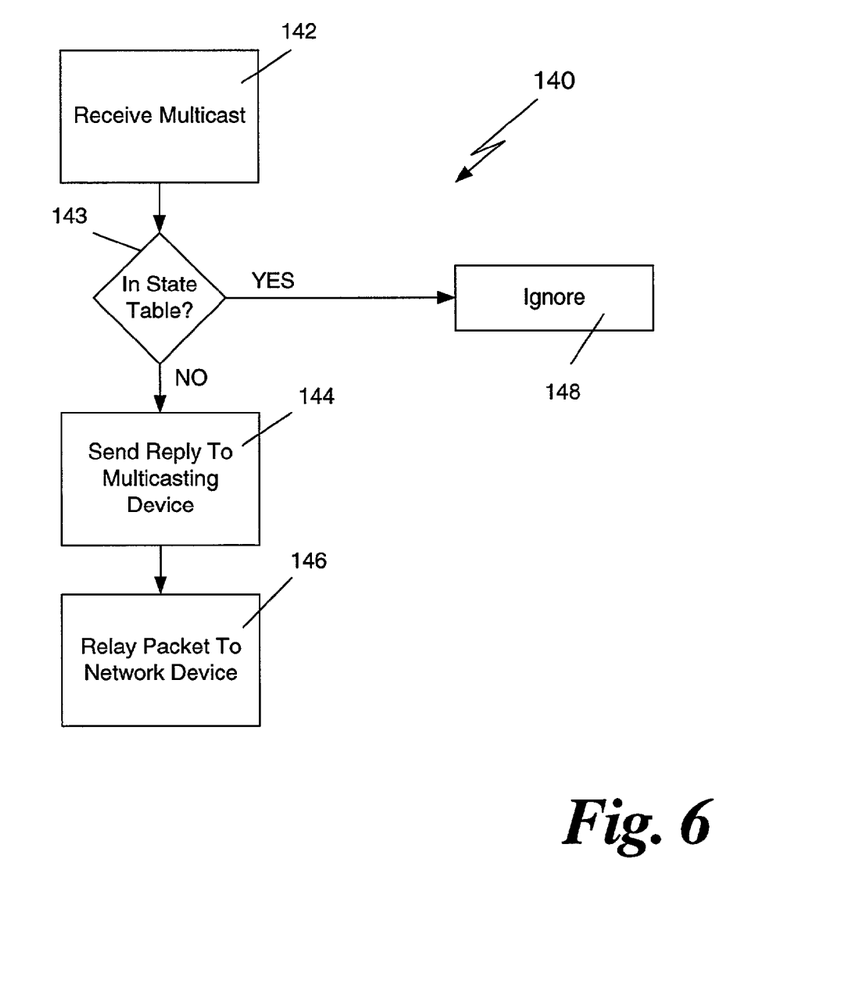
FIG. 6 shows a more detailed flow chart of the process of handling a multicast request by a recipient of the multicast.

FIGS. 5 and 6 illustrate the method 100 in one example in which firewall device A 12 is the home device for the data packet in question and firewall device B 14 is the receiving firewall device. As described herein, a firewall device 12, 14, 16, 18 can be both a receiving device and a home device, depending upon its state for a particular data packet or flow. In one embodiment, all firewall devices 12, 14, 16, 18 in a cluster 10 may implement the same steps in the method 100, depending upon their states. FIG. 5 shows a flow chart of one embodiment of portions of the method 100 shown in FIG. 2, as implemented by firewall device B 14 receiving data packets from the Internet 20 or from another firewall device 12, 16, 18, firewall device A 12 in the example.

The receiving device 14 receives 120 a data packet and determines 122 whether the receiving device 14 is the home device for the packet, for example, if the packet is part of an established connection to the Internet 20 or if it is a packet has been forwarded from another firewall device, such as firewall devices A, C, or D 12, 16, 18 in the example. If the packet is at its "home" firewall device—that is, if the receiving device 14 is also the home device—then the receiving device 14 processes 146 the packet in its ordinary course, for example, by inspecting and relaying the packet to the appropriate internal host 40. If the packet is an "unrecognized" packet, then the receiving device 14 determines 124 if its forward table 15 has information about the home device, firewall device A 12 in this example, for the packet. If the forward table 15 already has information for the packet, then the device 14 forwards 126 the packet to the home device 12 based on the information in the forward table 15. If the forward table 15 does not have information for the packet, then the receiving device 14 sends 130 a multicast to other firewall devices 12, 16, 18. The multicast includes the data packet and a request that the home device 12, firewall device A 12 in this example, send a response. The multicast may include identification information about itself so that the home device 12 can send the response. After sending 130 the multicast, the receiving firewall device 14 receives 132 a reply from the home device 12 indicating the identity of the home device 12. The receiving device 14 updates 134 its forward table 15 to reflect the home device information. All subsequent data packets associated with the flow may be automatically forwarded 126 to the home device 12 using the forward table 15.

FIG. 6 shows a more detailed flow chart of the method 140 used by a firewall device 12, 14, 16, 18 to handle receipt of a multicast. To illustrate the method 140, FIG. 6 again employs the example of FIGS. 2, 3, and 5 in which firewall device A 12 is the home device for the packet and firewall device B 14 is the receiving device. A device 12, 16, 18 receives 142 a multicast from a receiving device 14 including the data packet and additional information about the receiving device 14. The device 12, 16, 18 receiving the multicast determines 143, based on information in its state table 13, whether it is the home device for the packet. If it is not the home device, then the device 12, 16, 18 receiving the multicast simply ignores 148 the multicast in one embodiment. If the device 12, 16, 18 is the home device 12, then it sends 144 a response signal to the receiving device 14 that sent the multicast. The response signal includes information indicating that the firewall device 12 sending 144 the response signal is the home device 12. The response signal is received by the receiving device 14 and the information in the response signal is added to other forwarding information, if any, to process subsequent packets. The home device 12 also extracts the packet from the multicast signal and processes 146 it, for example, by relaying 146 it to the appropriate internal host 40.

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

What is claimed is:

1. A method of handling firewall transactions in a firewall cluster of interconnected firewall devices, the method comprising:
   receiving, at only a first firewall device in the firewall cluster from an internal host, a connection-initiation signal for initiating a flow of data packets between an internal network and an external network;
   receiving at only a second firewall device in the firewall cluster a data packet from the external network, the data packet being related to the flow; and
   sending the data packet from the second firewall device in the cluster to the first firewall device in the cluster using forwarding information.

2. The method of claim 1, further comprising storing in the first firewall device state information related to the internal host.

3. The method of claim 1, further comprising determining whether the forwarding information includes information about a home device of the data packet, and wherein the step of sending comprises sending based on the determining.

4. The method of claim 3, wherein the step of sending comprises sending the data packet as part of a multicast including information about .the second device.

5. The method of claim 1, wherein the step of sending comprises sending the data packet as part of a multicast including information about the second device.

6. The method of claim 5, further comprising:
   receiving at the second device information associating the flow with the first device; and
   storing the information with the forward information.

7. The method of claim 1, further comprising using state information to determine whether the data packet should be sent to the first device, and wherein the step of sending comprises sending based on the using.

8. A method of processing firewall transactions in a firewall cluster having multiple interconnected firewall devices that connect at least one internal host connected to an internal network to an external network, the method comprising:
   receiving at a firewall device in the cluster a data packet that is part of a flow of data between the external network and the internal network; and
   sending a multicast from the firewall device in the cluster to at least one other firewall device in the cluster to determine a home device for the packet.

9. The method of claim 8, wherein the step of receiving comprises receiving an unrecognized data packet.

10. The method of claim 8, further comprising determining whether the firewall device is the home device using state information, and wherein the step of sending comprises sending based on the determining.

11. The method of claim 8, further comprising:
   attempting to identify the home device using forwarding information; and
   forwarding the packet to the home device based on the attempting, and wherein the step of sending comprises sending based on the forwarding.

12. The method of claim 8, wherein the step of sending comprises sending a multicast request comprising:
   the data packet; and
   information about the device.

13. The method of claim 12, further comprising receiving a response signal from the home device, wherein the response signal is sent based on the information.

14. The method of claim 13, further comprising storing forwarding information identifying the home device based on the response signal.

15. A firewall device comprising:
   a storage medium;
   a processor for executing a software program stored on the storage medium for processing firewall transactions, the software program comprising computer-executable instructions for performing a method, the method comprising:
   receiving at a firewall device in a cluster a data packet that is part of a flow of data between an external network and an internal network; and
   sending a multicast from the firewall device in the cluster to at least one other firewall device in the cluster to determine a home device for the packet.

16. The device of claim 15, wherein the step of receiving comprises receiving an unrecognized data packet.

17. The device of claim 15,
   further comprising a state table stored on the storage medium, wherein the state table stores state information related to one or more flows of data packets for which the device is a home device, and
   wherein the method further comprises determining whether the firewall device is the home device using the state information, and
   wherein the step of sending comprises sending based on the determining.

18. The device of claim 15,
   further comprising a forward table stored on the storage medium, wherein the forward table stores forwarding information about at least one home device of a data flow for which another firewall device is the home device;
   wherein the method further comprises:
   attempting to identify the home device using the forwarding information; and
   forwarding the packet to the home device based on the attempting, and wherein the step of sending comprises sending based on the forwarding.

19. The device of claim 15, wherein the step of sending comprises sending a multicast request comprising:

the data packet; and information about the device, and wherein the method further comprises receiving a response signal from the home device.

20. The device of claim 15, wherein the method further comprises storing in a forward table data identifying the home device based on the information.

21. The method of claim 1, wherein the first firewall device and a second firewall device in the firewall cluster are geographically separated.

22. The method of claim 8, wherein the firewall device and the at least one other firewall device in a firewall cluster are geographically separated.

23. The firewall device of claim 15, wherein the firewall device and the at least one other firewall device in a firewall cluster are geographically separated.

24. A method for handling communication transactions in a firewall cluster including a plurality of interconnected firewall devices, the method comprising:

receiving a first data packet at only one of the plurality of firewall devices in the firewall cluster, wherein the first data packet is received from an internal network for initiating a connection to an external network;

receiving a second data packet associated with a data flow at only one of the plurality of firewall devices in the firewall cluster, wherein the second data packet is received from the external network in response to the first data packet;

if the only one firewall device in the firewall cluster receiving the second data packet is a home device for the second data packet, forwarding the second data packet associated with the data flow to a first internal host in the internal network;

if the only one firewall device in the firewall cluster receiving the second data packet is not the home device for the second data packet, forwarding a multicast signal to other firewall devices in the firewall cluster, receiving, in response to the multicast signal, at the only one firewall device in the firewall cluster, a confirmation from another firewall device in the firewall cluster that the another firewall device is the home device for the second data packet associated with the data flow, and forwarding the second data packet associated with the data flow to the another firewall device in the firewall cluster confirmed to be the home device to the second data packet associated with the data flow.

25. The method of claim 24, further comprising:

receiving the second data packet associated with the flow at the another firewall device in the firewall cluster confirmed to be the home device for the second data packet; and forwarding the second data packet associated with the data flow to a second internal host in the internal network by the another firewall device in the firewall cluster confirmed to be the home device for the second data packet.

26. The method of claim 24, further comprising:

storing in a forwarding table, at the only one firewall device in the firewall cluster receiving the second data packet, information identifying the another firewall device in the firewall cluster confirmed to be the home device for the second data packet associated with the data flow.

27. The method of claim 26, further comprising:

receiving additional data packets from the external network at the only one firewall device in the firewall cluster receiving the second data packet, wherein the additional data packets are associated with the data flow; and based on information stored in the forwarding table, forwarding the additional data packets, received from the external network, to the another firewall device in the firewall cluster confirmed to be the home device for the second data packet associated with the data flow.

28. The method of claim 27, further comprising:

receiving the additional data packets associated with the flow at the another firewall device in the firewall cluster confirmed to be the home device for the second data packet; and forwarding the additional data packets associated with the data flow to a second internal host in the internal network by the another firewall device in the firewall cluster confirmed to be the home device for the second data packet.

* * * * *